K. WACKER & E. HILDENBRAND.
FEED APPARATUS FOR USE IN THE MANUFACTURE OF CORD CHAINS.
APPLICATION FILED JULY 24, 1911.
1,030,215.
Patented June 18, 1912.
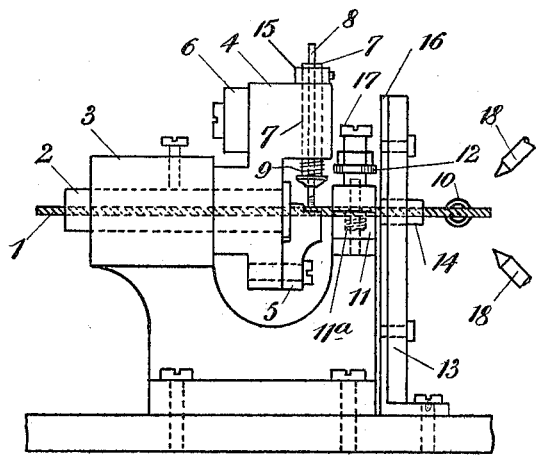
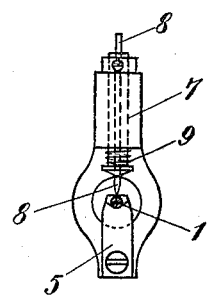
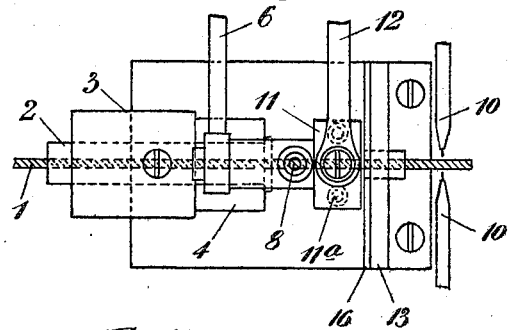
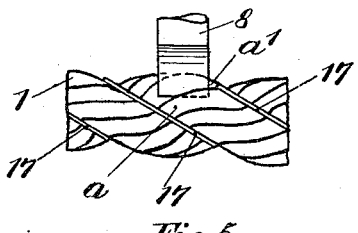
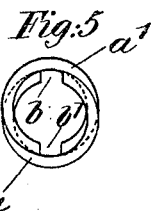
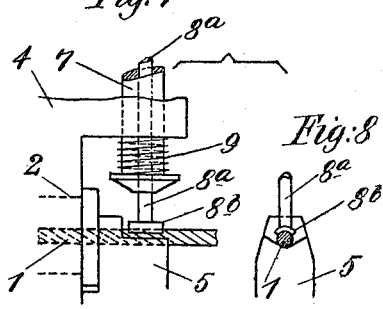
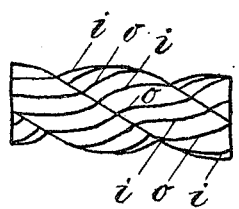
Witnesses.
C. A. Walter
O. S. Hathaway
The Inventors.
Karl Wacker & Emil Hildenbrand.
by R. Madden
Attorney.

UNITED STATES PATENT OFFICE.

KARL WACKER AND EMIL HILDENBRAND, OF PFORZHEIM, GERMANY.

FEED APPARATUS FOR USE IN THE MANUFACTURE OF CORD-CHAINS.

1,030,215.

Specification of Letters Patent. Patented June 18, 1912.

Application filed July 24, 1911. Serial No. 640,156.

*To all whom it may concern:*

Be it known that we, KARL WACKER and EMIL HILDENBRAND, subjects of the German Emperor, both residing at Pforzheim, Baden, in Germany, have invented a certain new and useful Improvement in Feed Apparatus for Use in the Manufacture of Cord-Chains, of which the following is a specification.

So-called cord-chains made up of gapped, twisted rings, interlinked and overlapping each other, are commonly in the course of manufacture held together by a wire helically twisted about the chain, until the necessary soldering has been performed, whereupon the said wire is removed, the soldering being performed by hand, which is a slow and expensive process.

The object of the present invention is to provide apparatus for mechanically performing the soldering operation, such apparatus having means for intermittently feeding the chain, with a screw motion whereby linked rings having their gaps diametrically opposite each other are consecutively fed to the soldering position, to be converted, by soldering, into double rings.

The invention is illustrated in the accompanying drawing, in which:—

Figure 1 is an elevation of the machine, and Fig. 2 a plan-view thereof. Fig. 3 shows part of the chain feed mechanism, drawn to a larger scale, and Fig. 4 illustrates the engagement of the chain with this part of the feed mechanism. Fig. 5 shows two of the linked rings forming the chain, and Fig. 6 shows a portion of the finished chain. Fig. 7 shows a modification of part of the chain feed mechanism, Fig. 8 showing a detail of Fig. 7, viewed perpendicularly to the plane of the latter.

In the drawing, 1 represents the chain, which is fed into a tube 2 fixed inside a bearing 3, the chain being at this stage held together by wire 17. On the tube 2 is mounted a rocker 4, with a channeled support 5, on which the chain rests. The rocker can be rocked by means of a lever 6 actuated by a suitable motor, for example by means of an eccentric. Above the support 5 a tube 7 is slidably mounted in the rocker 4, perpendicular to the chain. In this tube 7 is a fixed rod 8, and the tube is thrust downward, toward the chain, by a spring 9. In the construction best shown in Figs. 3 and 4 the rod 8 is tapered to an edge at its lower end, so that it can engage between the links, as between the links $a$, $a^1$ in Fig. 4, said links being arranged with their gaps $b$, $b^1$ diametrically opposite each other, as shown in Fig. 5.

In the modification shown in Figs. 7 and 8 the rod $8^a$ (equivalent to the rod 8) has at its lower end a kind of channeled shoe $8^b$, which it presses against the upper surface of the chain.

Between the rocker 4 and the soldering appliance 10, 18, the chain passes between two channeled cheeks 11, one of which is movable to and from the other and is normally slightly lifted from the other cheek by springs $11^a$. These cheeks form a bi-partite guide for the chain, the wall of the channel in said guide being screwed in accordance with the screw-like formation of the chain. The movable cheek can be actuated by a rocking cam lever 12, so that the cheeks alternately grip the chain tightly and release the same to such extent that rotation of the chain can take place, with the chain still in engagement with the screwed guide channel. Between the bi-partite guide formed by 11 and the soldering appliance the chain passes through a guide 14 in an asbestos screen 13 which is fixed to a support 13 for the purpose of protecting the mechanism from the heat of the soldering flames. The position of the rod 8 is adjustable by means of an adjusting ring 15, according to the thickness of the chain, the tube 7 being slidable in the said ring, in which it can be fixed by a screw.

The action of the apparatus is as follows:—The lever 6 is actuated for rocking the rocker 4, with the rod 8 engaging the chain, and the lever 12 is at the same time actuated so that the chain is alternately released and gripped at a rate coinciding with the alternation of the rocking movements of the part 4. The chain is thus screwed through the guide channel, the spring pressed rod 8 being able to release the chain while the latter is gripped by the cheeks 11. The chain is thus fed forward in steps, the soldering being performed at the joints $i$, to make the double rings, but not at the joints $o$ between consecutive pairs of rings.

What we claim as our invention and desire to secure by Letters Patent of the United States is:—

1. Apparatus for the purpose set forth comprising two members having screw-threaded channels adapted to collectively embrace and engage a cord-chain, means for imparting relative movement to said members so that they are enabled to alternatively tightly grip and loosely engage a cord-chain in said channels, a device adapted to loosely engage a cord-chain outside said channels, and means for rocking said chain engaging device so that a cord-chain engaged with the latter and with the channeled members is rotated by said chain engaging device unless tightly gripped by said channeled members.

2. Apparatus for the purpose set forth comprising a soldering appliance, two members having screw-threaded channels adapted to collectively embrace and engage a cord-chain, means for imparting relative movement to said members so that they are enabled to alternatively tightly grip and loosely engage a cord-chain in said channels, a device adapted to loosely engage a cord-chain outside said channels, and means for rocking said chain engaging device so that a cord-chain engaged with the latter and with the channeled members is rotated by said chain engaging device unless tightly gripped by said channeled members.

In witness whereof we have signed this specification in the presence of two witnesses.

KARL WACKER.
EMIL HILDENBRAND.

Witnesses:
A. O. TITTMANN,
S. H. SHANK.

Copies of this patent may be obtained for five cents each, by addressing the "Commissioner of Patents, Washington, D. C."